United States Patent
Wolf et al.

(10) Patent No.: US 9,453,553 B2
(45) Date of Patent: Sep. 27, 2016

(54) SPRING RETAINER FOR A TORSIONAL VIBRATION DAMPER AND METHOD OF PRODUCING A SPRING RETAINER

(71) Applicant: Schaeffler Technologies GmbH & Co. KG, Herzogenaurach (DE)

(72) Inventors: Frank Wolf, Wooster, OH (US); Rolf Mueller, Wooster, OH (US)

(73) Assignee: Schaeffler Technologies AG & Co., Herzogenaurach (DE)

( * ) Notice: Subject to any disclaimer, the term of this patent is extended or adjusted under 35 U.S.C. 154(b) by 108 days.

(21) Appl. No.: 14/251,964

(22) Filed: Apr. 14, 2014

(65) Prior Publication Data

US 2014/0353892 A1    Dec. 4, 2014

Related U.S. Application Data

(60) Provisional application No. 61/828,023, filed on May 28, 2013.

(51) Int. Cl.
| | | |
|---|---|---|
| *F16F 15/123* | (2006.01) | |
| *F16F 15/134* | (2006.01) | |
| *F16F 15/12* | (2006.01) | |

(52) U.S. Cl.
CPC ..... F16F 15/12313 (2013.01); F16F 15/1203 (2013.01); F16F 15/1343 (2013.01); *F16F 2226/047* (2013.01); *Y10T 29/49609* (2015.01)

(58) Field of Classification Search
CPC ............. F16F 15/1211; F16F 15/1212; F16F 15/1232; F16F 15/1234; F16F 15/1343; F16F 15/13438; F16F 15/13453; F16F 15/12313; Y10T 29/49609
See application file for complete search history.

(56) References Cited

U.S. PATENT DOCUMENTS

| | | | |
|---|---|---|---|
| 5,209,330 A | 5/1993 | Macdonald | |
| 6,446,779 B1 * | 9/2002 | Yabe | F16F 15/1232 192/212 |
| 6,675,457 B1 | 1/2004 | Redmond et al. | |
| 7,585,226 B2 | 9/2009 | Uhler et al. | |
| 7,937,937 B2 | 5/2011 | Wolf et al. | |
| 2010/0252971 A1 * | 10/2010 | Lee | B60G 11/16 267/140.11 |
| 2011/0247322 A1 * | 10/2011 | Lindemann | F16F 15/1343 60/338 |

FOREIGN PATENT DOCUMENTS

DE           19955852 A1 *  5/2001  .......... F16F 15/1203

* cited by examiner

*Primary Examiner* — Anna Momper
(74) *Attorney, Agent, or Firm* — Chester Paul Maliszewski; Kevin L. Parks (57) ABSTRACT

A spring retainer for a torsional vibration damper, including: first and second oppositely facing sides; at least one curved portion forming at least part of a radially outermost portion of the spring retainer and including: at least a portion of the first side enclosing at least one space and including at least one indentation extending in a circumferential direction; and at least a portion of the second side including at least one protrusion extending in the circumferential direction.

5 Claims, 9 Drawing Sheets

SPRING RETAINER FOR A TORSIONAL VIBRATION DAMPER AND METHOD OF PRODUCING A SPRING RETAINER

CROSS-REFERENCE TO RELATED APPLICATIONS

This application claims the benefit under 35 U.S.C. §119 (e) of U.S. Provisional Application No. 61/828,023, filed May 28, 2013, which application is incorporated herein by reference in its entirety.

TECHNICAL FIELD

The present disclosure relates to a spring retainer, for a torsional vibration damper, including circumferential indentations and protrusions in a radially outer part of the spring retainer forming pockets for holding springs. The present disclosure also relates to a method of fabricating a spring retainer, for a torsional vibration damper, including circumferential indentations and protrusions in a radially outer part of the spring retainer forming pockets for holding springs.

BACKGROUND

It is known to stamp sheet metal blanks to form a spring retainer for a torsional vibration damper. To form the pockets that will hold the springs for the damper, the radially outermost portion of the blank must be curled over itself toward a center of the blank. However, the opening to the pocket must be reduced such that it is not possible to support the lower side of the outermost portion as the upper side is pushed and pressed by a die to perform the curling. Due to this lack of support, the curled portion may not attain the desired curvature and undesirable flattening, kinking, or other distortion may occur. In addition, the repeatability of the curling operation is compromised.

SUMMARY

According to aspects illustrated herein, there is provided a spring retainer for a torsional vibration damper, including: first and second oppositely facing sides; at least one curved portion forming at least part of a radially outermost portion of the spring retainer and including: at least a portion of the first side enclosing at least one space and including at least one indentation extending in a circumferential direction; and at least a portion of the second side including at least one protrusion extending in the circumferential direction.

According to aspects illustrated herein, there is provided a spring retainer for a torsional vibration damper, including: first and second oppositely facing sides; a plurality of curved portions partially enclosing respective spaces and forming respective parts of a radially outermost portion of the spring retainer; and for each curved portion in the plurality of curved portions: a respective portion of the first side partially enclosing the respective space and including a plurality of circumferentially disposed and radially aligned indentations; and a respective portion of the second side including a respective plurality of circumferentially disposed and radially aligned protrusions. Each indentation is aligned, in a direction orthogonal to the first or second side, with a respective protrusion.

According to aspects illustrated herein, there is provided a method of fabricating a spring retainer for a torsional vibration damper, including: stamping at least a portion of a radially outer circumferential portion of a disk-shaped blank including first and second oppositely facing sides; displacing material in the at least a portion to create at least one circumferentially extending indentation in the first side, and at least one circumferentially extending protrusion in the second side; stamping the radially outer portion to curl at least one part of the radially outermost portion including the at least one indentation and protrusion; forming at least one space, with the at least one part, at least partially enclosed by at least a portion of the first side including the at least one indentation; supporting at least a portion of the second side including the at least one protrusion; and pressing on the radially outer circumference to push the radially outer circumference toward a center of the blank.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1A:
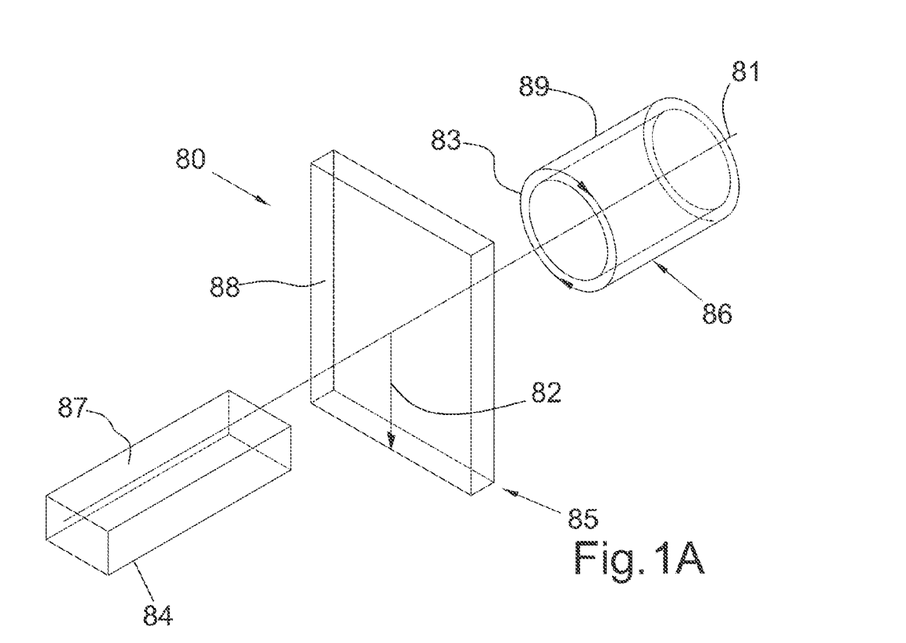
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present disclosure is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
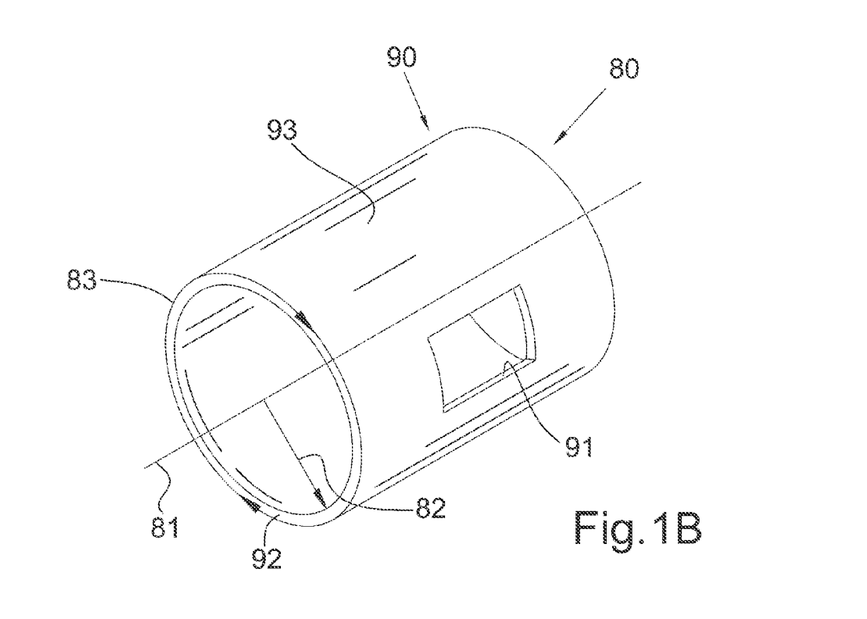
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

Figure 2:
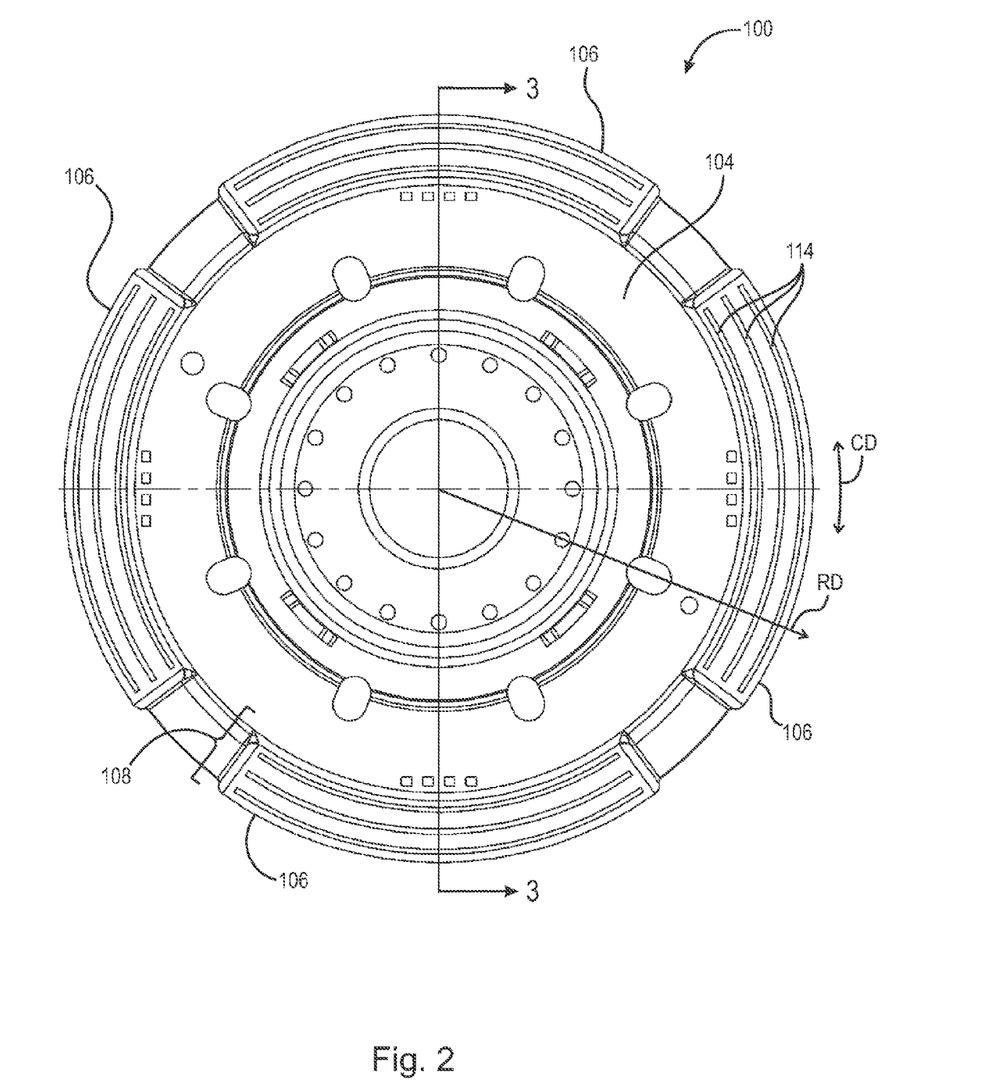
FIG. 2 is a back view of a spring retainer for a torsional damper with at least one circumferential groove and protrusion.

FIG. 2 is a back view of spring retainer 100 for a torsional damper with circumferential grooves and protrusions.

Figure 3:
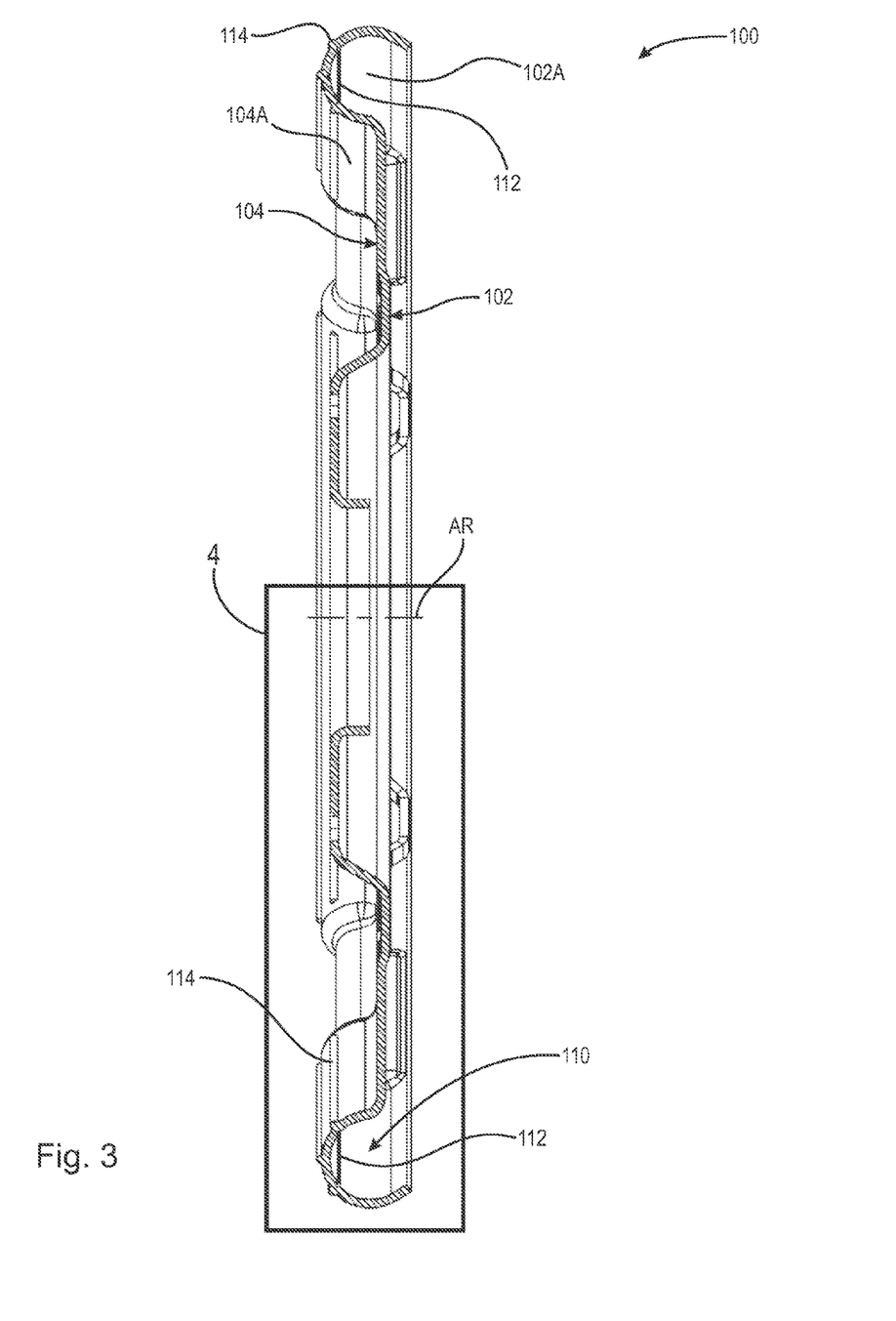
FIG. 3 is a partial cross-sectional view of the spring retainer of FIG. 2 generally along line 3-3 in FIG. 2.

FIG. 3 is a partial cross-sectional view of spring retainer 100 of FIG. 2 generally along line 3-3 in FIG. 2.

Figure 4:
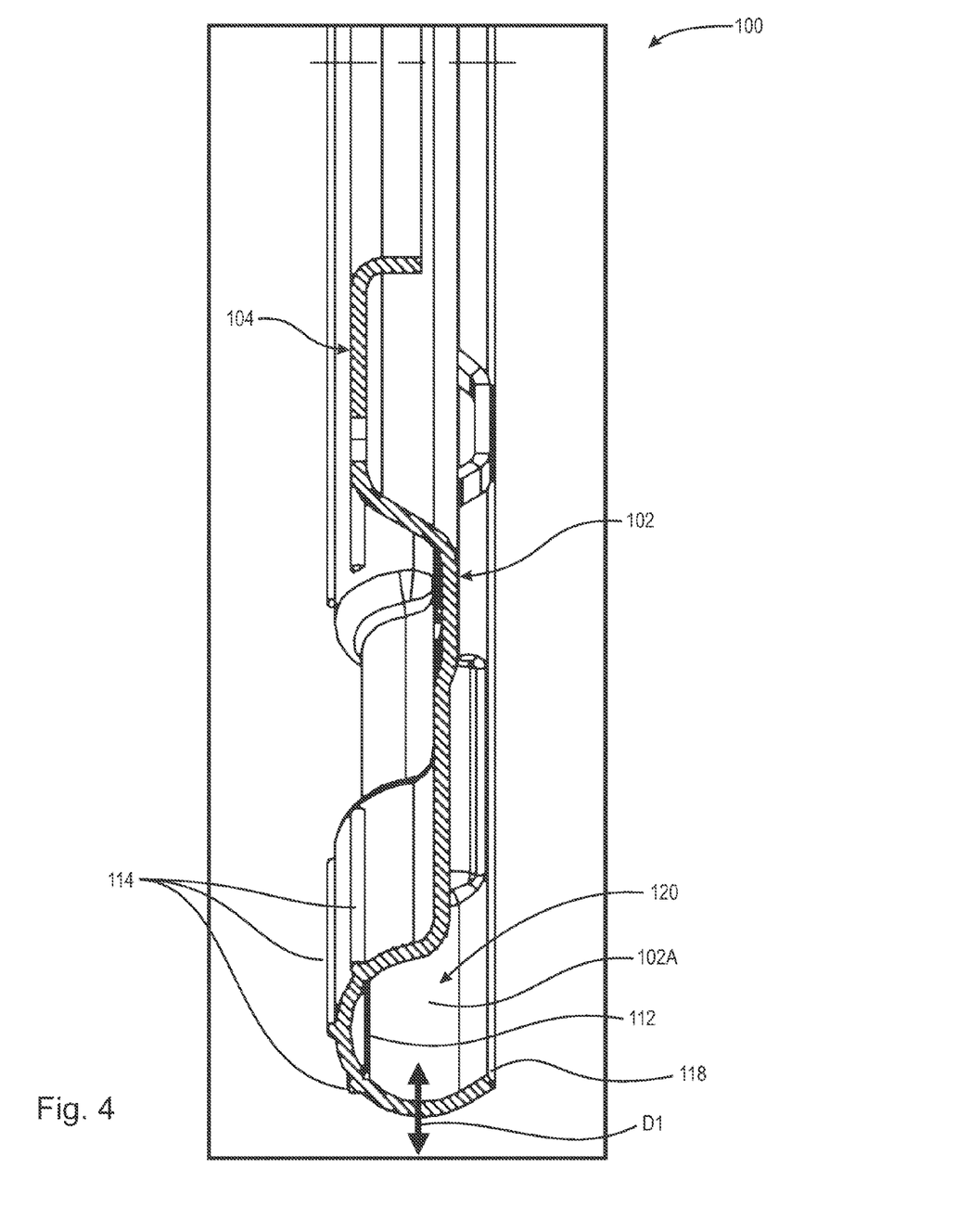
FIG. 4 is a detail of area 4 in FIG. 3.

FIG. 4 is a detail of area 4 in FIG. 3. The following should be viewed in light of FIGS. 2 through 4. Spring retainer 100 for a torsional vibration damper includes axis of rotation AR and oppositely facing back and front sides 102 and 104, respectively, and at least one curved portion 106. In an example embodiment, retainer 100 includes a plurality of portions 106, for example, as shown in FIG. 2. The discussion that follows is directed to a single portion 106; however, it should be understood that the discussion is applicable to retainer 100 having a single portion 106 or to each portion 106 in a plurality of portions 106. Portion 106 forms part of radially outermost portion 108 of the retainer. As seen in FIGS. 3 and 4, the curl of portion 106 is well seen in a radial cross-section.

Figure 5:
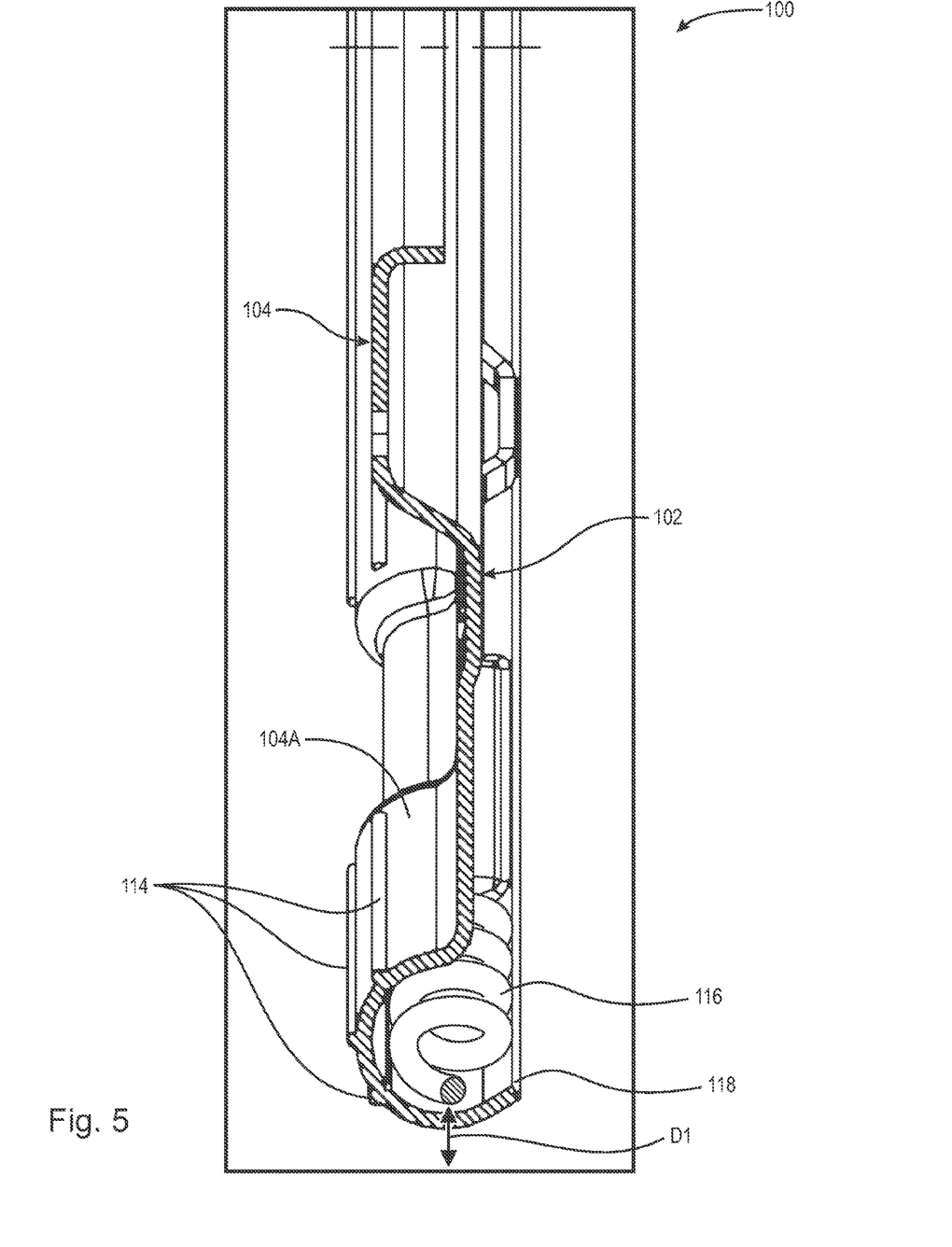
FIG. 5 is a detail of area 4 in FIG. 3 with a spring added.

FIG. 5 is a detail of area 4 in FIG. 3 with a spring added. The following should be viewed in light of FIGS. 2 through 5. Portion 106 includes portion 102A of side 102 and portion 104A of side 104. Portion 102A at least partially encloses space, or spring pocket, 110 and includes at least one indentation 112 extending in circumferential direction CD. Portion 104A includes at least one protrusion 114 extending in direction CD. In an example embodiment, portion 102A includes a plurality of indentations 112 and portion 104A includes a plurality of protrusions 114. In an example embodiment, portion 106 has equal numbers of indentations 112 and protrusions 114. Although three indentations and protrusions are shown for each portion 106, it should be understood that other numbers or indentations and protrusions are possible. In an example embodiment, at least one spring 116 is located in each space 110. In an example embodiment, each indentation 112 is aligned with a respective protrusion 114 in direction D1 orthogonal to sides 102 and 104.

Figure 6:
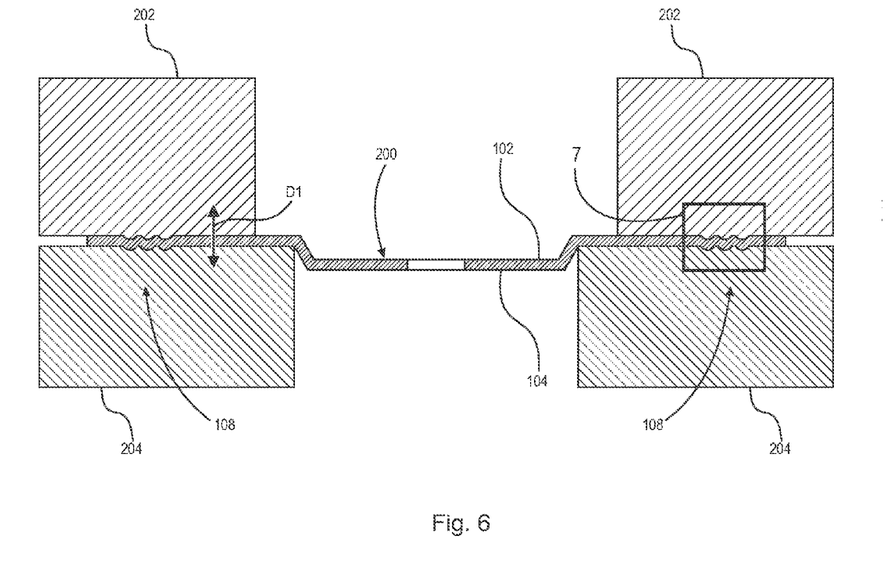
FIG. 6 is a schematic representation of a portion of a method for forming a spring retainer with at least one circumferential groove and protrusion.

FIG. 6 is a schematic representation of a portion of a method for forming a spring retainer with at least one circumferential groove and protrusion.

Figure 7:
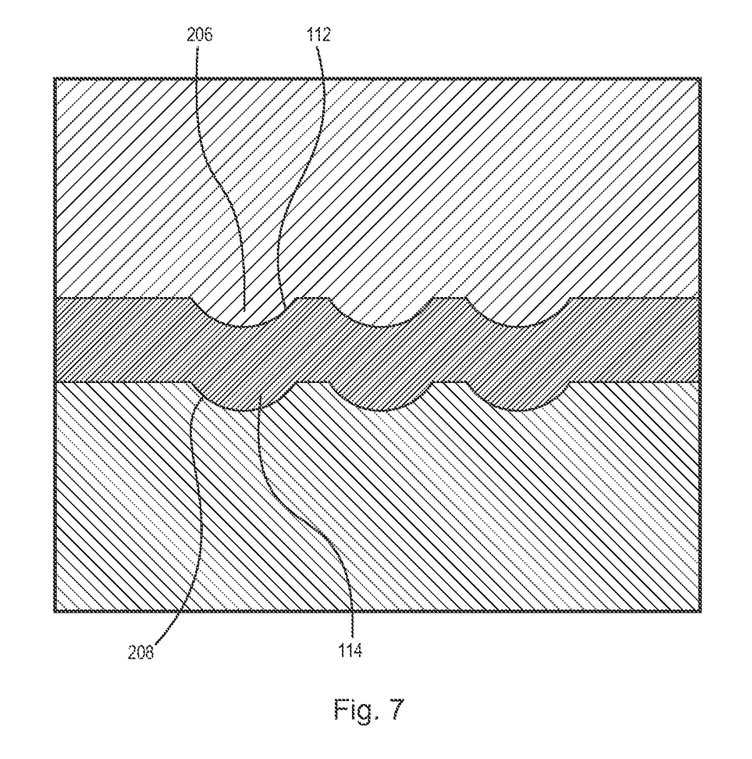
FIG. 7 is a detail of area 7 of FIG. 6.

FIG. 7 is a detail of area 7 of FIG. 6. The following should be viewed in light of FIGS. 2 through 7. The method includes stamping, using dies 202 and 204, at least a portion of a radially outer circumferential portion, for example portion 108, of disk-shaped blank 200 including two oppositely facing surfaces, for example sides 102 and 104. Dies 202 and 204 displace material forming blank 200 to create at least one circumferentially extending indentation in one side, for example indentation 112 in side 102, and at least one circumferentially extending protrusion in the oppositely facing side, for example protrusion 114 in side 104. For example, die 202 includes protrusions 206 and die 204 includes indentations 208. Protrusions 206 displace the material of blank 200 into respective indentations 208, forming indentations 112 and protrusions 114. In an example embodiment, each indentation is aligned with a respective protrusion in direction D1.

Figure 8:
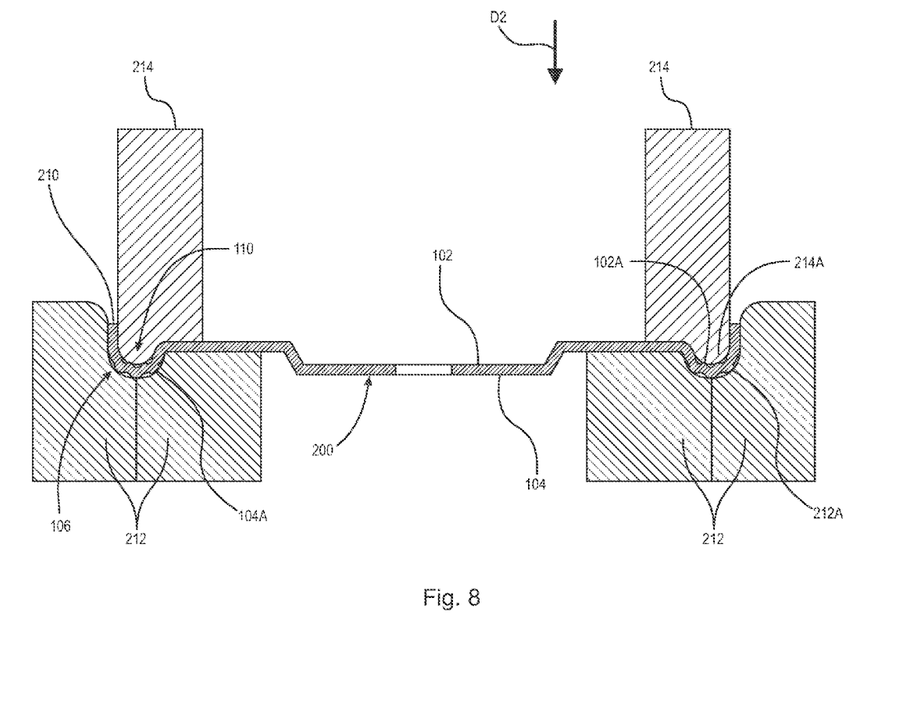
FIG. 8 is a schematic representation of another portion of a method for forming a spring retainer with at least one circumferential groove and protrusion; and, FIG. 9 is a schematic representation of a further portion of a method for forming a spring retainer with at least one circumferential groove and protrusion.

FIG. 8 is a schematic representation of another portion of a method for forming a spring retainer with at least one circumferential groove and protrusion. The following should be viewed in light of FIGS. 2 through 8. This portion of the method stamps the radially outer portion to curl at least one part, for example portion 106, of the radially outermost portion including the at least one indentation and protrusion. This portion also forms at least one space with the at least one part, for example, space 110, at least partially enclosed by at least a portion of the side including the at least one indentation, for example, portion 102A. Radially outer circumference 210 of the blank, for example, edge 118 of retainer 100, bounds the curled part on one side.

For example, dies 212 support blank 200 while die 214 is lowered in direction D2. Protrusion 214A of die 214 pushes portion 106 into indent 212A formed by die 212. In an example, embodiment portion 106 is formed into a U-shape.

Figure 9:
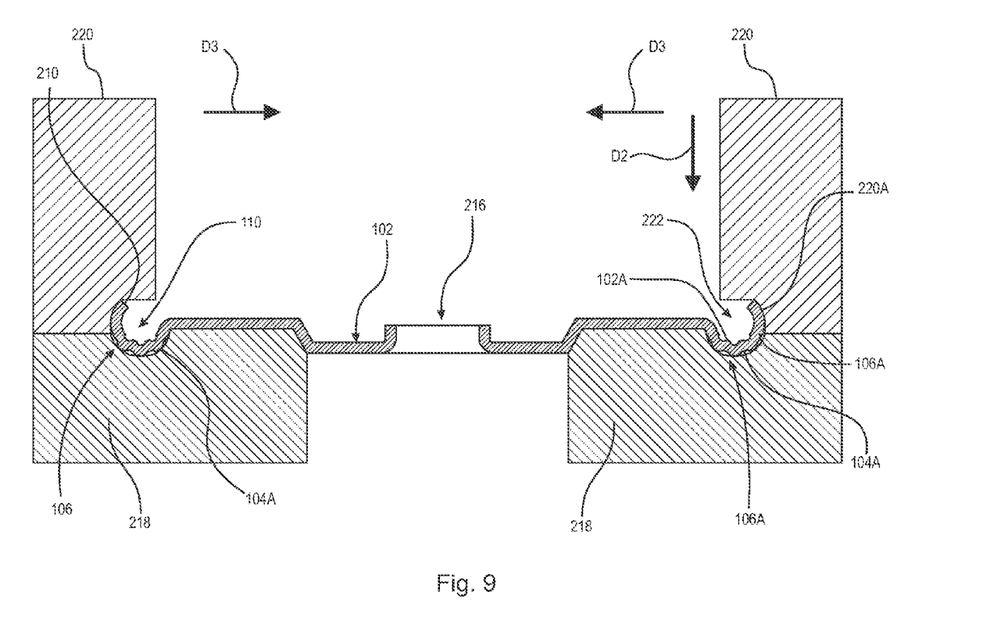

FIG. 9 is a schematic representation of a further portion of a method for forming a spring retainer with at least one circumferential groove and protrusion. The following should be viewed in light of FIGS. 2 through 9. This portion of the method supports at least a portion of one side including the at least one protrusion, for example portion 104A and presses on radially outer circumference 210 to push radially outer circumference 210 toward center 216 of the blank. For example, as die 220 is lowered in direction D2, surface 220A, which slopes in direction D3 toward center 216, bends circumference 210 in direction D3, further curling the radially outer portion, for example, segment 106A. Curling segment 106A reduces a size of opening 222 (opening 120 for retainer 100) to space 110. Reducing opening 222 helps hold a spring in place.

Advantageously, indents 112 and protrusions 114 enable a more precise and controlled curling of blank 200 to form spaces 110. For example, the indents and protrusions facilitate a smoother and kink-free curling of portion 108. Further, the indents and protrusions facilitate more consistent and repeatable curling.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A spring retainer for a torsional vibration damper, comprising:
   first and second oppositely facing sides;
   a plurality of curved portions partially enclosing respective spaces and forming respective parts of a radially outermost portion of the spring retainer; and,
   for each curved portion in the plurality of curved portions:
   a respective portion of the first side partially enclosing the respective space and including a plurality of circumferentially disposed and radially aligned indentations; and,
   a respective portion of the second side including a respective plurality of circumferentially disposed and radially aligned protrusions, wherein:
   each indentation is aligned, in a direction orthogonal to the first or second side, with a respective protrusion.

2. The spring retainer of claim 1, wherein said each curved portion is curved in a line orthogonal to an axis of rotation for the spring retainer.

3. The spring retainer of claim 1, wherein each respective space is arranged to hold a respective spring.

4. The spring retainer of claim 1, wherein:
   each plurality of circumferentially disposed and radially aligned indentations and the respective plurality of circumferentially disposed and radially aligned protrusions are each continuous in the circumferential direction.

5. The spring retainer of claim 1, wherein said each curved portion is separated from remaining curved portions in the circumferential direction.

* * * * *